United States Patent
Zhao et al.

(10) Patent No.: US 12,033,615 B2
(45) Date of Patent: Jul. 9, 2024

(54) METHOD AND APPARATUS FOR RECOGNIZING SPEECH, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yinlou Zhao, Beijing (CN); Liao Zhang, Beijing (CN); Zhengxiang Jiang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 17/499,129

(22) Filed: Oct. 12, 2021

(65) Prior Publication Data
US 2022/0028370 A1    Jan. 27, 2022

(30) Foreign Application Priority Data
Nov. 4, 2020    (CN) .......................... 202011219185.7

(51) Int. Cl.
*G10L 15/00* (2013.01)
*G10L 15/14* (2006.01)
(Continued)

(52) U.S. Cl.
CPC .......... *G10L 15/005* (2013.01); *G10L 15/142* (2013.01); *G10L 15/16* (2013.01); *G10L 15/26* (2013.01)

(58) Field of Classification Search
CPC ..... G10L 15/005; G10L 15/142; G10L 15/16; G10L 15/26; G10L 15/063; G10L 15/14; G06F 40/216; G06F 40/284; G06F 40/53
(Continued)

(56) References Cited

U.S. PATENT DOCUMENTS

| 2005/0038654 A1 | 2/2005 | Emonts et al. |
| 2005/0165602 A1 | 7/2005 | Cote et al. |

(Continued)

FOREIGN PATENT DOCUMENTS

| CN | 1412741 A | 4/2003 |
| CN | 1598924 A | 3/2005 |

(Continued)

OTHER PUBLICATIONS

Notice of Allowance issued for Japanese patent application No. 2021-175876, mailed Apr. 4, 2023 (5 pages).
(Continued)

*Primary Examiner* — Pierre Louis Desir
*Assistant Examiner* — Fouzia Hye Solaiman
(74) *Attorney, Agent, or Firm* — Osha Bergman Watanabe & Burton LLP (57) ABSTRACT

The disclosure provides a method and an apparatus for recognizing a speech, an electronic device and a storage medium. A speech to be recognized is obtained. An acoustic feature of the speech to be recognized and a language feature of the speech to be recognized are obtained. The speech to be recognized is input to a pronunciation difference statistics to generate a differential pronunciation pair corresponding to the speech to be recognized. The text information of the speech to be recognized is generated based on the differential pronunciation pair, the acoustic feature and the language feature.

12 Claims, 5 Drawing Sheets

(51) Int. Cl.
  *G10L 15/16* (2006.01)
  *G10L 15/26* (2006.01)
(58) Field of Classification Search
  USPC .......................................................... 704/235
  See application file for complete search history.

(56) References Cited

U.S. PATENT DOCUMENTS

| | | | |
|---|---|---|---|
| 2011/0035219 | A1 | 2/2011 | Kadirkamanathan et al. |
| 2020/0111484 | A1* | 4/2020 | Aleksic .................. G10L 15/22 |
| 2020/0193971 | A1 | 6/2020 | Feinauer et al. |
| 2020/0294488 | A1* | 9/2020 | Li ......................... G06F 40/242 |

FOREIGN PATENT DOCUMENTS

| | | | | | |
|---|---|---|---|---|---|
| CN | 104637482 | A | | 5/2015 | |
| CN | 108334605 | A | | 7/2018 | |
| CN | 109545184 | A | | 3/2019 | |
| CN | 110019821 | A | * | 7/2019 | |
| CN | 110019821 | A | | 7/2019 | |
| CN | 110827803 | A | | 2/2020 | |
| CN | 110930979 | A | | 3/2020 | |
| CN | 111540353 | A | | 8/2020 | |
| CN | 111738023 | A | | 10/2020 | |
| CN | 111816160 | A | | 10/2020 | |
| CN | 111540353 | B | * | 11/2022 | ............. G06F 40/30 |
| JP | 2006098994 | A | | 4/2006 | |
| JP | 2015087540 | A | | 5/2015 | |

OTHER PUBLICATIONS

Office Action issued for Chinese patent application No. 202011219185.7, mailed May 15, 2023 (24 pages).

\* cited by examiner

METHOD AND APPARATUS FOR RECOGNIZING SPEECH, ELECTRONIC DEVICE AND STORAGE MEDIUM

CROSS REFERENCE TO RELATED APPLICATION(S)

This application claims priority and benefits to Chinese Application No. 202011219185.7, filed on Nov. 4, 2020, the entire content of which is incorporated herein by reference.

TECHNICAL FIELD

The disclosure relates to a field of speech technologies and a field of deep learning technologies, and more particularly to a method and an apparatus for recognizing a speech, an electronic device, and a storage medium.

BACKGROUND

In related arts, a Chinese recognition system for a certain scene can be generally decomposed into the following. Data labelling is performed, including related audios, audio labelling and related scene texts. Model training is performed, including an acoustic model training and a language model training. Composition is performed, including constructing a Look-Ahead (it refers to a technology to calculate a language model score and perform path clipping when a decoder performs a path retrieval). The acoustic model, the language model and the decoder are combined to form a final recognition system. In addition, due to limited resultant resources of the target scene, in order to obtain good results, there is a need to train a translator to translate a recognition result of a certain scene into the simplified Chinese.

SUMMARY

In one embodiment, a method for recognizing a speech is provided. The method includes: obtaining a speech to be recognized; obtaining an acoustic feature and a language feature of the speech to be recognized; inputting the speech to be recognized to a pronunciation difference statistics to generate a differential pronunciation pair corresponding to the speech to be recognized; and generating text information of the speech to be recognized based on the differential pronunciation pair, the acoustic feature, and the language feature.

In one embodiment, an electronic device is provided. The electronic device includes: at least one processor; and a memory communicatively coupled to the at least one processor. The memory stores instructions executable by the at least one processor. The instructions are executed by the at least one processor, to cause the at least one processor to execute a method for recognizing a speech as described above.

In one embodiment, a non-transitory computer-readable storage medium storing computer instructions is provided. The computer instructions are configured to cause a computer to execute a method for recognizing a speech as described above.

It is to be understood that, the content described in the part is not intended to recognize key or important features of embodiments of the disclosure, nor intended to limit the scope of the disclosure. Other features of the disclosure will be easy to understand through the following specification.

BRIEF DESCRIPTION OF THE DRAWINGS

The drawings are intended to make the skilled person in the art to well understand the solution, and do not constitute a limitation to the disclosure.

DETAILED DESCRIPTION

Exemplary embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

Emergence of the speech recognition system makes the user's hands free and greatly brings convenience to the user. The speech recognition system is a trend of future technologies. Generally, the speech recognition based on the Mandarin Chinese may meet the user's requirement to a certain extent and bring a good user experience. However, in some certain scenes, for example, the effect of a speech recognition and searching system based on the Cantonese language is not as good as that of the speech recognition and searching system based on the Mandarin Chinese. Reasons may be few training resources of the search based on the Cantonese language can be obtained and thus high cost of the manual labelling is caused. For training the searching based on the Cantonese language, more resources are needed. Generally, the final resultant resources of the searching based on the Cantonese language are relatively less and the final resultant resources of the searching based on the simplified Chinese are relatively rich. By only training the recognition system of the target scene, the final effect is unsatisfied and cannot meet the user's requirements. Therefore, a related Cantonese-Mandarin text translator is trained, which further increases the workload.

Generally, a Chinese recognition system under a certain scene can be decomposed into the following. Data labelling is performed, including related audios, audio labelling and related scene texts. Model training is performed, including an acoustic model training and a language model training. Composition is performed, including constructing a Look-Ahead (it refers to a technology to calculate a language model score and perform path clipping when a decoder performs a path retrieval). The acoustic model, the language model and the decoder are combined to form a final recognition system. In addition, due to limited resulted resources under the target scene, in order to obtain good results, there is a need to train a translator to translate the recognition result under the certain scene into the simplified Chinese.

However, existing technical solutions of training a Chinese speech recognition system for a certain scene typically has the following disadvantages. 1) A project cycle is long, since implementation of the system generally requires starting from the beginning based on the above manner, which needs to select models and debug the system, thereby consuming a large amount of manpower and material resources. 2) It is required to additionally train a translation system from the target scene to the simplified Chinese, thereby consuming a large of resources. 3) Due to the combination of the recognition system for the target scene and the translation system, which is not a strong dependency relationship, the final results are affected by both the recognition system for the target scene and the translation system, thereby increasing the difficulty degree of the system integration.

In order to solve the above technical problems, the disclosure provides a method and an apparatus for recognizing a speech, an electronic device and a storage medium, which may utilize existing system resources to perform rapid iteration and achieve better results, thereby saving manpower and material resources.

In detail, the method and the apparatus for recognizing a speech, the electronic device and the storage medium will be described below in combination of drawings of the disclosure.

Figure 1:
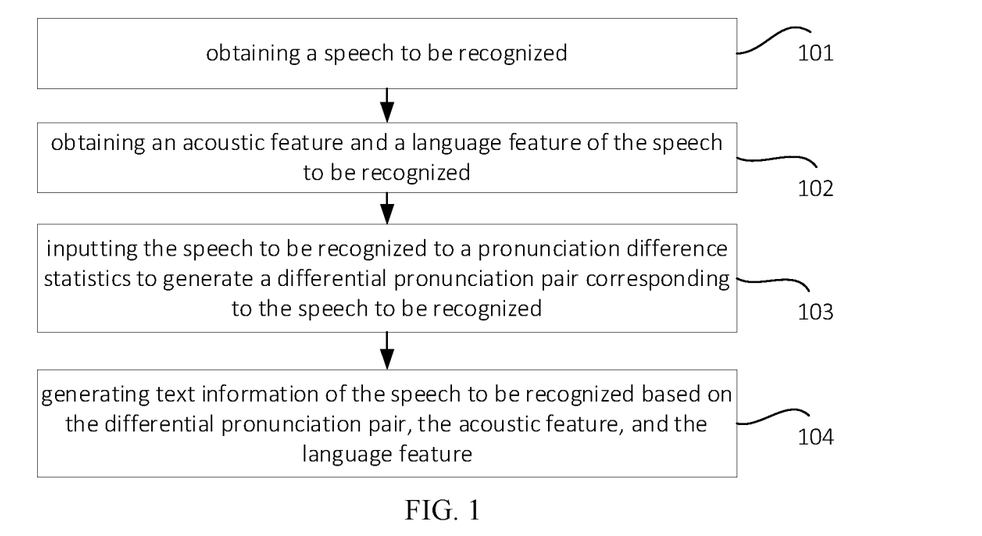
FIG. 1 is a flowchart illustrating a method for recognizing a speech according to some embodiments of the disclosure.

FIG. 1 is a flowchart illustrating a method for recognizing a speech according to some embodiments of the disclosure. It is to be noted that, the method for recognizing a speech according to embodiments of the disclosure is applicable to an apparatus for recognizing a speech according to embodiments of the disclosure. The apparatus for recognizing a speech is arranged on an electronic device.

As illustrated in FIG. 1, the method for recognizing a speech may include the following.

At block 101, a speech to be recognized is obtained.

As an example, the method for recognizing a speech according to embodiments of the disclosure is applied to a Chinese recognition system for a certain target scene. Taking the recognition from the Cantonese to the simplified Chinese as an example, the disclosure may recognize a Cantonese speech to obtain a corresponding text of the simplified Chinese. As an example, the language type of the speech to be recognized may be the Cantonese.

As an example, the method for recognizing a speech according to embodiments of the disclosure may be applied to a search engine. For example, the search engine may support Cantonese speech recognition. In a case that it is monitored that the Cantonese speech is input by the user to the search engine, the speech input by the user may be determined as the speech to be recognized, and the speech to be recognized can be recognized to obtain the corresponding text of the simplified Chinese, such that the search engine can perform the searching based on the text of the simplified Chinese, to achieve a Cantonese speech search function.

At block 102, an acoustic feature and a language feature of the speech to be recognized are obtained.

In embodiments of the disclosure, when the speech to be recognized is obtained, the speech to be recognized may be input to an acoustic model to obtain the acoustic feature of the speech to be recognized, and the speech to be recognized may be input to a language model to obtain the language feature of the speech to be recognized.

In embodiments of the disclosure, the acoustic model may be a model that is trained by Gaussian Mixed Model (GMM)-Hidden Markov Model (HMM), or Deep Neural Network (DNN)-HMM. The language model may be a model that is trained by an N-Gram (which is a statistic-based language model) or a Nerual Network Language Model (NNLM).

At block 103, the speech to be recognized is input to a pronunciation difference statistics to generate a differential pronunciation pair corresponding to the speech to be recognized.

When the speech to be recognized is obtained, the speech to be recognized may be input to a pre-trained pronunciation difference statistics to obtain the differential pronunciation pair corresponding to the speech to be recognized. For example, for an audio, the corresponding text obtained through the recognition is "乜嘢 (which are Cantonese characters and the meaning is "what")" and its pronunciation is "mie ye (which are Chinese phonetic alphabets)", while the labelled text is "什么 (which are simplified Chinese characters and the meaning is "what")" and its pronunciation is "shen me (which are Chinese phonetic alphabets)". In this case, "mie ye" and "shen me" form a differential pronunciation pair.

It is to be noted that, in embodiments of the disclosure, the pronunciation difference statistics is trained in advance. The pronunciation difference statistics is configured to make a statistics on the pronunciation difference between the labelled text and the text obtained through the recognition, set a threshold based on actual situations, and screen the differential pronunciation pairs. After a large amount of target sample texts under relevant target scenes are obtained, a prediction is performed on the target sample texts by an original speech recognition system. By comparing the recognition results and the target sample texts to obtain the differences, the differential pronunciation pairs are obtained. Thus, the expanded pronunciations of each target sample text can be mined. The training process of the pronunciation difference statistics may be described with reference to the following.

At block 104, text information of the speech to be recognized is generated based on the differential pronunciation pair, the acoustic feature, and the language feature.

In some embodiments of the disclosure, the differential pronunciation pair, the acoustic feature, and the language feature can be input to a decoder to generate the text information of the speech to be recognized.

It is to be noted that, in embodiments of the disclosure, the decoder may be built based on Weighted Finite-State Transducer (WFST). That is, the decoder may be trained by the WFST model.

It is to be noted that the method for recognizing a speech according to embodiments of the disclosure is applied to a Chinese speech recognition system. The Chinese speech recognition system includes a pronunciation difference statistics, an acoustic model, a language model, and a decoder. The Chinese speech recognition system may be configured to recognize the Cantonese speech to obtain the simplified Chinese text corresponding to the Cantonese speech, thereby achieving recognition of the Cantonese voice to obtain the Chinese text.

With the method for recognizing a speech according to embodiments of the disclosure, the speech to be recognized may be obtained, and the acoustic feature and the language feature of the speech to be recognized are obtained. The speech to be recognized is input to the pronunciation difference statistics to generate the differential pronunciation pair corresponding to the speech to be recognized, and the text information of the speech to be recognized is generated based on the differential pronunciation pair, the acoustic feature and the language feature. Therefore, compared with the existing speech recognition system which needs to train a translator to translate a recognition result under a certain scene into the simplified Chinese to enhance the recognition effect, the disclosure obtains the text information of the speech to be recognized under the certain scene by mining the differential pronunciation pair and inputting the differential pronunciation pair, the acoustic feature and the language feature to the decoder for recognition. In this way, the speech recognition system may learn a mapping relationship between the certain scene and the simplified Chinese from the source without the need of additionally training a translator to improve the effect, thereby saving manpower and material resources. In addition, the expanded training may be performed on the basis of the original system without the need of re-performing the model training, thereby reducing the development cost of the Chinese speech recognition system and shortening the training cycle of the speech recognition system.

Figure 2:
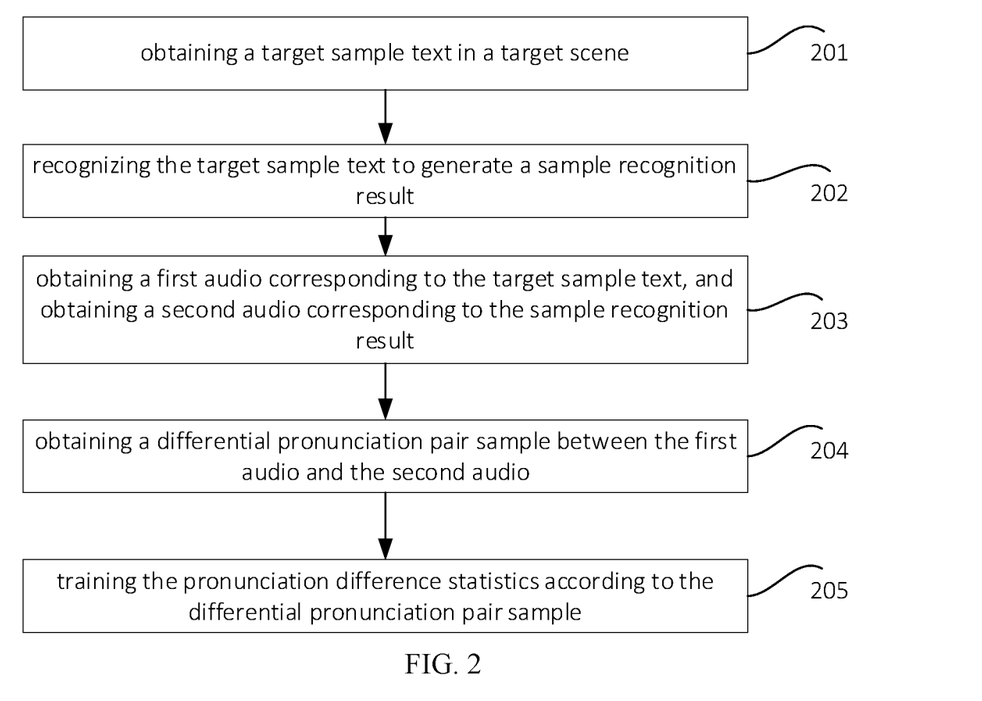
FIG. 2 is a flowchart illustrating a method for recognizing a speech according to some embodiments of the disclosure.

It is to be noted that, the pronunciation difference statistics may be trained in advance. In some embodiments of the disclosure, as illustrated in FIG. 2, the pronunciation difference statistics may be trained through the following.

At block 201, a target sample text is obtained under a target scene.

In some embodiments of the disclosure, the sample text may be obtained and the sample text may be input to a target scene text classifier to determine whether the sample text belongs to a target scene or not. The sample text is used as the target sample text in a case where the sample text belongs to the target scene. The sample text is discarded in a case where the sample text does not belong to the target scene.

As an example, the sample text may be obtained from various websites on the Internet by using a web crawler technology. For example, the web crawler technology may be adopted to obtain the sample text from a website, and the sample text is input to a pre-trained target scene text classifier to determine whether the sample text belongs to the target scene based on a classification result of the target scene text classifier. When the sample text belongs to the target scene, the sample text is determined as the target sample text. When the sample text does not belong to the target scene, the sample text is discarded. Taking the recognition from the Cantonese to the simplified Chinese as the target scene, the web crawler technology is adopted to obtain the sample texts, and the sample texts are input to the target scene text classifier to obtain sample texts matching the target scene. Each sample text matching the target scene is determined as a target sample text.

In embodiments of the disclosure, a target scene text classifier may be a Bayesian text classifier, a support vector machine text classifier, or a neural network text classifier, etc., which can be determined based on actual situations. Further, a perplexity (PPL) value may be used for data filtering. The classifier is configured to obtain data matching the target scene. As an example, a DNN-based text classifier can be used. The target scene text is used as a positive sample, the non-target scene text is used as a negative sample, and the positive samples and the negative samples are inputted to the DNN after the word vector mapping, to obtain the target scene text classifier. Therefore, the target sample texts under the target scene are mined.

At block 202, the target sample text is recognized to generate a sample recognition result.

In embodiments of the disclosure, when the target sample text under the target scene is obtained, a prediction can be performed by an original speech recognition system to obtain the sample recognition result.

At block 203, a first audio corresponding to the target sample text is obtained and a second audio corresponding to the sample recognition result is obtained.

For example, taking the recognition from the Cantonese to the simplified Chinese as the target scene, where the language type of the target sample text is the Cantonese and the language type of the sample recognition result is the simplified Chinese, the first audio corresponding to the target sample text is the Cantonese audio, and the second audio corresponding to the sample recognition result is the Chinese audio.

At block 204, a differential pronunciation pair between the first audio and the second audio is obtained.

In at least one embodiment, the first audio and the second audio may be compared to obtain a difference therebetween and the differential pronunciation pair between the first audio and the second audio may be obtained. The differential pronunciation pair may be taken as the expanded pronunciation of the target sample text under the target scene.

At block 205, the pronunciation difference statistics is trained based on the differential pronunciation pair samples.

In at least one embodiment, after the differential pronunciation pair samples are obtained, the differential pronunciation pair samples are compared with a threshold. In a case where a difference value of a differential pronunciation pair sample is less than the threshold, i.e., the pronunciation difference between the first audio and the second audio is less than the threshold, the differential pronunciation pair sample is discarded. Thus, the differential pronunciation pair that the pronunciation difference is greater than or equal to the threshold is maintained. In this way, the statistics is made on the differential pronunciation pair samples of the target sample text (i.e., the differential pronunciation pair sample refers to those that the pronunciation difference is greater than the threshold) to obtain the differential pronunciation pairs and the obtained differential pronunciation pairs are determined as the training data of the pronunciation difference statistics, to realize the statistics on the pronunciation difference between the pair of the labelled text and the text obtained through the recognition. As another example, the pronunciation difference statistics can be trained through a deep learning technology based on the differential pronunciation pair samples to obtain the trained pronunciation difference statistics. Therefore, the speech can be recognized through the trained pronunciation difference statistics to obtain the differential pronunciation pair corresponding to the speech.

For example, for an audio, the text obtained through the recognition is "乜嘢" and its pronunciation is "mie ye", whilst the labelled text is "什么" and its pronunciation is "shen me". In this case, "mie ye" and "shen me" are a differential pronunciation pair. In this way, the pronunciation difference statistics is obtained by performing the statistics on the pronunciation difference between the pair of the labelled text and the text obtained through the recognition.

Therefore, the existing system for the certain scene and the existing data resources are fully utilized for training the data mining, which reduces additional resource labelling cost. In addition, the differential pronunciation pairs are mined and sent to the Chinese speech recognition system for training, such that the speech recognition system may learn a mapping relationship between the certain scene and the simplified Chinese from the source.

Figure 3:
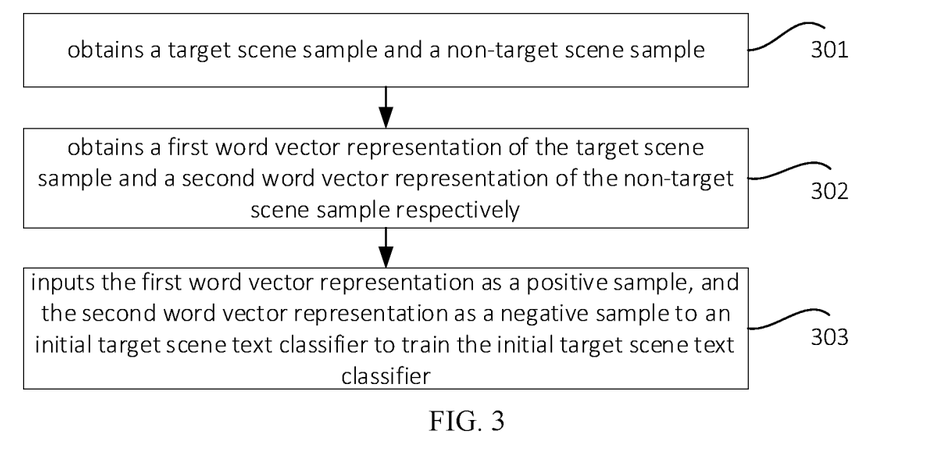
FIG. 3 is a flowchart illustrating a method for recognizing a speech according to some embodiments of the disclosure.

It is to be noted that, the target scene text classifier may be trained in advance. In some embodiments of the disclosure, as illustrated in FIG. 3, the target scene text classifier may be obtained through the training as follows.

At block 301, a target scene sample and a non-target scene sample are obtained.

At block 302, a first word vector representation of the target scene sample and a second word vector representation of the non-target scene sample are obtained.

At block 303, the first word vector representation is input as a positive sample and the second word vector representation is input as a negative sample to an initial target scene text classifier to train the initial target scene text classifier.

It is to be noted that, the target scene text classifier may be a Bayesian text classifier, a support vector machine text classifier, or a neural network text classifier, etc., which can be determined based on actual situations. Further, a perplexity (PPL) value may be used for data filtering to obtain data matching the target scene. As an example, the initial target scene text classifier can be a DNN-based text classifier. The target scene text is used as a positive sample, the non-target scene text is used as a negative sample, and the positive samples and the negative samples are inputted to the DNN after the word vector mapping, to obtain the target scene text classifier. Therefore, the target sample texts under the target scene are mined through the target scene text classifier.

In order to make those skilled in the art clearly understand the disclosure, detailed descriptions will be made in combination with FIG. 4 and FIG. 5.

Figure 4:
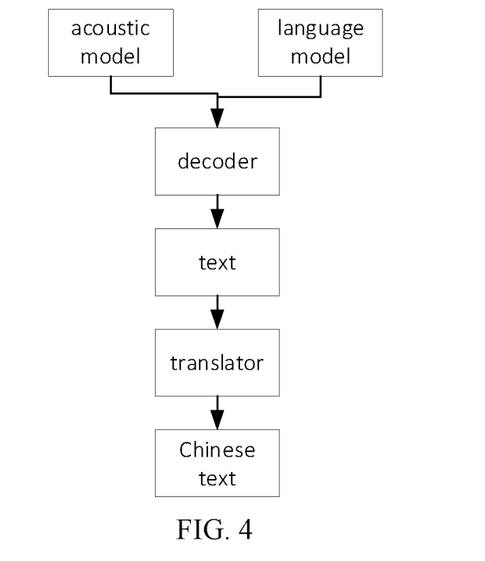
FIG. 4 is a schematic diagram illustrating an existing Chinese recognition system under a target scene.

FIG. 4 illustrates an existing Chinese text recognition system under a target scene. Taking the recognition from the Cantonese to the simplified Chinese as an example, those skilled in the art generally need to train a Cantonese speech recognition system, including the acoustic model training and the language model training, and translate the recognition result into the Chinese text through the machine translation.

Figure 5:
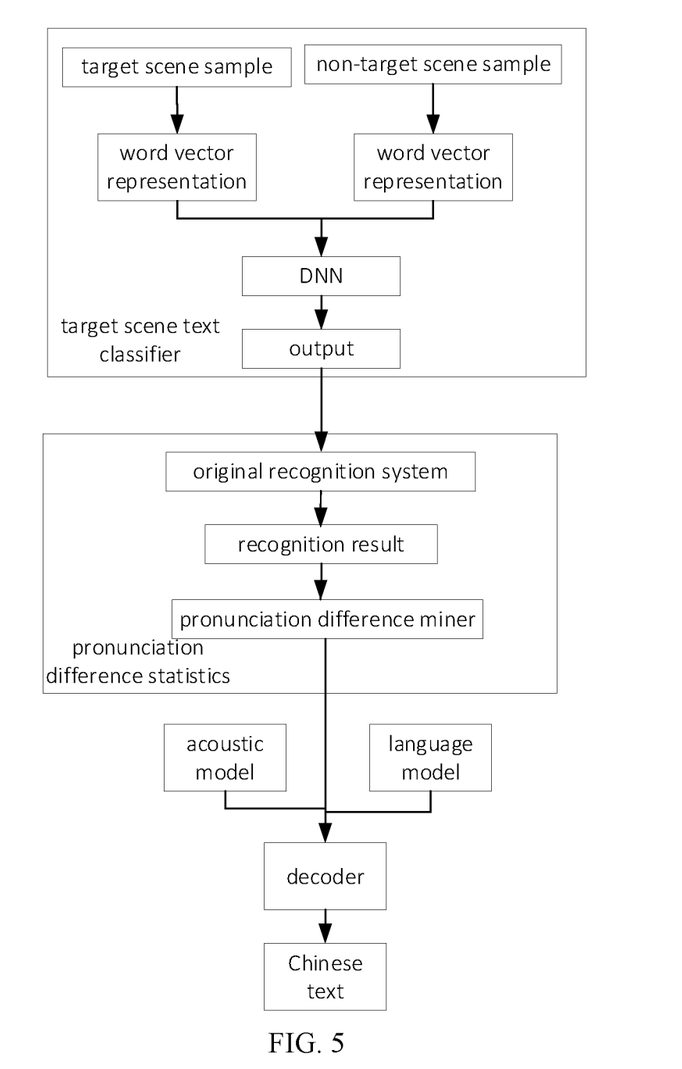
FIG. 5 is a schematic diagram illustrating a Chinese recognition system under a target scene based on pronunciation difference according to some embodiments of the disclosure.

FIG. 5 is a schematic diagram illustrating a Chinese recognition system under a target scene based on pronunciation difference according to embodiments of the disclosure. The target scene text classifier may be, for example, a Bayesian text classifier, a support vector machine text classifier, or a neural network text classifier, etc., which can be determined based on actual situations. Further, a perplexity (PPL) value may be used for data filtering. The classifier is configured to obtain data matching the target scene. As an example, a DNN-based text classifier can be used. The target scene text is used as a positive sample, the non-target scene text is used as a negative sample, and the positive samples and the negative samples are inputted to the DNN after the word vector mapping, to obtain the target scene text classifier. Therefore, the target sample texts under the target scene are mined.

The pronunciation difference statistics is configured to make a statistics on the pronunciation difference between the labelled text and the text obtained through the recognition. The user may set a threshold based on the actual situation to screen the differential pronunciation pairs. After a large number of relevant target texts are obtained, a prediction is performed by the original speech recognition system. The difference between the recognition result and the target text is obtained by comparing the recognition result and the target text to find relevant differential pronunciation pairs, thereby mining the expanded pronunciations of the target text.

The Chinese speech recognition system may be trained with the screened differential pronunciation pairs based on the existing recognition system. The expended differential pronunciation pairs, the language model, the acoustic model and the decoder form the final Chinese speech recognition system, such that the audio under the target scene may be recognized as the Chinese text.

In conclusion, the differences between the Chinese speech recognition system according to the disclosure and the existing recognition system (for example, the audio recognition from the Cantonese to the Chinese text) may include the following. 1) No related text translator needs to be trained and the Chinese text may be directly generated by the Chinese speech recognition system according to the disclosure. 2) Existing data resources may be fully utilized for data mining and training by the Chinese speech recognition system according to the disclosure, thereby reducing the additional resource labelling cost. 3) There is no need to re-train another Chinese recognition system by the Chinese speech recognition system according to the disclosure and the expanded training may be performed on the basis of the original system, thereby reducing the development cost of the Chinese speech recognition system.

Therefore, in the disclosure, re-usability of the system can be realized by using the existing certain scene system, thereby saving manpower and material resources and shortening the project cycle without the need of retraining. In addition, there is no need to additionally train a translator. Compared with the existing training method where a translator is needed to enhance effects, in the disclosure, the system may learn the mapping relationship between a certain scene and the simplified Chinese from the source by mining the differential pronunciation pairs and sending the differential pronunciation pairs to the Chinese speech recognition system for training.

Figure 6:
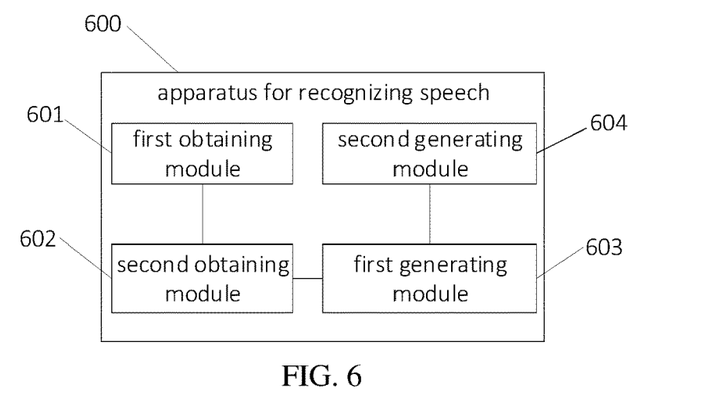
FIG. 6 is a block diagram illustrating a structure of an apparatus for recognizing a speech according to some embodiments of the disclosure.

FIG. 6 is a block diagram illustrating a structure of an apparatus for recognizing a speech according to some embodiments of the disclosure. As illustrated in FIG. 6, the apparatus 600 for recognizing a speech may include a first obtaining module 601, a second obtaining module 602, a first generating module 603 and a second generating module 604.

The first obtaining module 601 is configured to obtain a speech to be recognized.

The second obtaining module 602 is configured to obtain an acoustic feature of the speech to be recognized and a language feature of the speech to be recognized.

The first generating module 603 is configured to input the speech to be recognized to a pronunciation difference statistics to generate a differential pronunciation corresponding to the speech to be recognized.

The second generating module 604 is configured to generate text information of the speech to be recognized based on the differential pronunciation pair, the acoustic feature, and the language feature. As an example, the second generating module 604 is configured to input the differential pronunciation pair, the acoustic feature, and the language feature to a decoder to generate the text information of the speech to be recognized.

Figure 7:
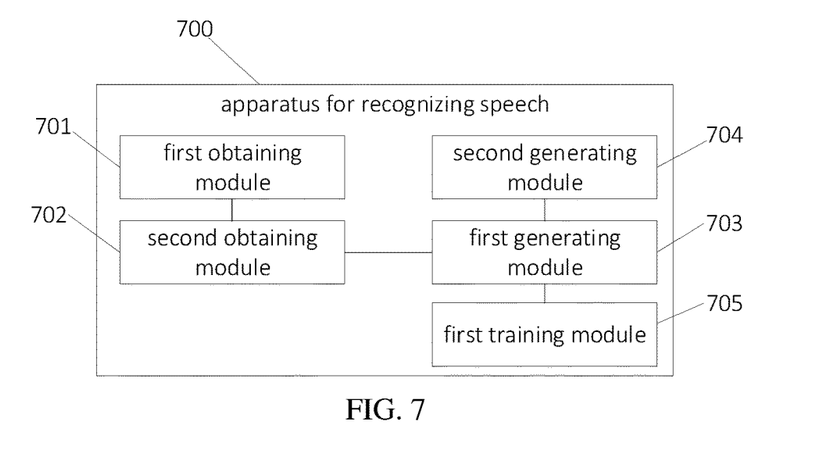
FIG. 7 is a block diagram illustrating a structure of an apparatus for recognizing a speech according to some embodiments of the disclosure.

In some embodiments, as illustrated in FIG. 7, the apparatus 700 for recognizing a speech may further include a first training module 705. The first training module 705 is configured to train the pronunciation difference statistics. In embodiments of the disclosure, the first training module 705 is configured to obtain a target sample text under a target scene; recognize the target sample text to generate a sample recognition result; obtain a first audio corresponding to the target sample text, and obtain a second audio corresponding to the sample recognition result; obtain a differential pronunciation pair between the first audio and the second audio; and train the pronunciation difference statistics based on the differential pronunciation pair samples.

In some embodiments of the disclosure, the first training module 705 is configured to obtain the target sample text under the target scene by: obtaining sample text, inputting the sample text into a target scene text classifier to determine whether the sample text belongs to a target scene; determining the sample text as the target sample text when the sample text belongs to the target scene, and discard the sample text when the sample text does not belong to the target scene.

The modules 701 to 704 in FIG. 7 have the same function and structure with the modules 601 to 604 in FIG. 6.

Figure 8:
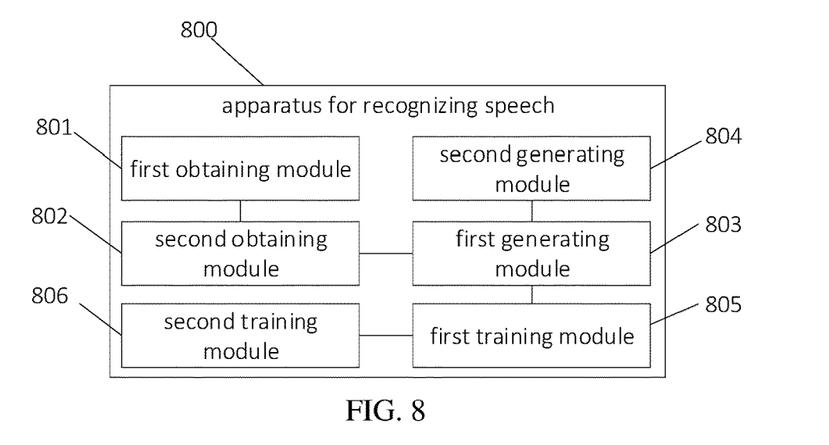
FIG. 8 is a block diagram illustrating a structure of an apparatus for recognizing a speech according to some embodiments of the disclosure.

In some embodiments, as illustrated in FIG. 8, an apparatus 800 for recognizing a speech may further include a second training module 806. The second training module 806 is configured to train a target scene text classifier. In embodiments of the disclosure, the second training module 806 is configured to obtain a target scene sample and a non-target scene sample; obtain a first word vector representation of the target scene sample and a second word vector representation of the non-target scene sample; and input the first word vector representation as a positive sample, and the second word vector representation as a negative sample to an initial target scene text classifier to train the initial target scene text classifier.

The modules 801 to 805 in FIG. 8 have the same function and structure with modules 701 to 705 in FIG. 7.

With regard to the apparatus in the above embodiments, the specific way in which each module performs the operation has been described in detail in the embodiments of the method and will not be elaborated here.

With the apparatus for recognizing a speech according to the embodiments of the disclosure, the speech to be recognized may be obtained, the acoustic feature of the speech to be recognized is obtained, and the language feature of the speech to be recognized is obtained. The speech to be recognized is input to the pronunciation difference statistics to generate a differential pronunciation pair corresponding to the speech to be recognized, and the text information of the speech to be recognized is generated based on the differential pronunciation pair, the acoustic feature and the language feature. Therefore, compared with the existing speech recognition system which often needs to train a translator to translate the recognition result of a certain scene into the simplified Chinese to enhance the recognition effect, in the disclosure, by mining the differential pronunciation pair and inputting the differential pronunciation pair, the acoustic feature and the language feature to a decoder for recognition, the text information of the speech to be recognized under the certain scene is obtained. In this way, the speech recognition system may learn a mapping relationship between the certain scene and the simplified Chinese from the source, and no additional training of the translator is needed for effect enhancement, which saves manpower and material resources. In addition, expanded training may be performed on the basis of the original system without the need of re-performing the model training, thereby reducing the development cost of the Chinese speech recognition system and shortening the training cycle of the speech recognition system.

According to embodiments of the disclosure, an electronic device and a readable storage medium are further provided in embodiments of the disclosure.

Figure 9:
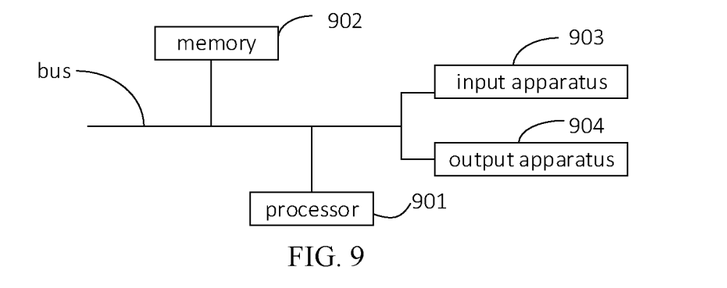
FIG. 9 is a block diagram illustrating an electronic device for implementing a method for recognizing a speech according to some embodiments of the disclosure.

FIG. 9 is a block diagram illustrating an electronic device for implementing a method for recognizing a speech according to embodiments of the disclosure. An electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components illustrated herein, their connections and relations, and their functions are merely examples, and are not intended to limit the implementation of the disclosure described and/or required herein.

As illustrated in FIG. 9, the electronic device may includes one or more processors 901, a memory 902, and an interface configured to connect various components, including a high-speed interface and a low-speed interface. The various components are connected to each other with different buses, and may be installed on a common main board or installed in other ways as needed. The processor may be configured to process instructions executed in the electronic device, including instructions stored in or on the memory to display graphical information of the GUI on an external input/output device (such as a display device coupled to an interface). In other implementation, multiple processors and/or multiple buses may be used together with multiple memories if necessary. Similarly, multiple electronic devices may be connected, and each device provides a part of necessary operations (for example, as a server array, a group of blade servers, or a multi-processor system). In FIG. 9, one processor 901 is taken as an example.

The memory 902 is a non-transitory computer-readable storage medium according to the disclosure. The memory stores instructions executable by the at least one processor, so that the at least one processor executes a method for recognizing a speech according to the disclosure. The non-transitory computer-readable storage medium of the disclosure stores computer instructions. The computer instructions are configured to cause the computer to execute a method for recognizing a speech according to the disclosure.

As a non-transitory computer-readable storage medium, the memory 902 may be configured to store non-transitory software programs, non-transitory computer-executable programs and modules, such as program instructions/modules corresponding to a method for recognizing a speech according to embodiments of the disclosure (for example, the first obtaining module 601, the second obtaining module 602, the first generating module 603, and the second generating module 604 as illustrated in FIG. 6). The processor 901 is configured to execute various functional applications and data processing of the server by running non-transitory software programs, instructions, and modules stored in the memory 902, to execute a method for recognizing a speech according to embodiments of the disclosure.

The memory 902 may include a program storage area and a data storage area. The program storage area may store operation systems and application programs required by at least one function. The data storage area may store data created based on the use of an electronic device according to the method for recognizing a speech, etc. In addition, the memory 902 may include a high-speed random access memory, and may also include a non-transitory memory, such as at least one magnetic disk storage device, a flash memory device, or other non-transitory solid-state storage devices. In some embodiments, the memory 902 optionally includes a memory set remotely relative to the processor 901 that may be connected to an electronic device executing a method for recognizing a speech via a network. The example of the above networks includes but not limited to an Internet, an enterprise intranet, a local area network, a mobile communication network and their combination.

An electronic device for implementing a method for recognizing a speech may further include an input apparatus 903 and an output apparatus 904. The processor 901, the memory 902, the input apparatus 903, and the output apparatus 904 may be connected through a bus or in other ways. FIG. 9 takes connection through a bus as an example.

The input apparatus 903 may receive input digital or character information, and generate key signal input related to user setting and function control of an electronic device configured to implement a method for recognizing a speech, such as a touch screen, a keypad, a mouse, a track pad, a touch pad, an indicating rod, one or more mouse buttons, a trackball, a joystick and other input apparatuses. The output apparatus 904 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service.

It is to be understood that, various forms of procedures shown above may be configured to reorder, add, or delete blocks. For example, blocks described in the disclosure may be executed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, subcombinations and substitutions may be made according to design requirements and other factors. Any modification, equivalent replacement, improvement, etc., made within the spirit and principle of embodiments of the disclosure shall be included within the protection scope of embodiments of the disclosure.

What is claimed is:

1. A method for recognizing a speech, performed by a speech recognition device including a search engine, an acoustic model, a language model and a decoder, the method comprising:

obtaining, through the search engine, a speech to be recognized;

obtaining an acoustic feature of the speech to be recognized by inputting the speech to be recognized into the acoustic model and obtaining a language feature of the speech to be recognized by inputting the speech to be recognized into the language model, wherein the acoustic model is a model trained by Gaussian Mixed Model (GMM)-Hidden Markov Model (HMI) or Deep Neural Network (DNN)-HMM, and the language model is a model trained by an N-Gram (which is a statistic-based language model) or a Neural Network Language Model (NNLM);

inputting the speech to be recognized to a pronunciation difference statistics to generate a differential pronunciation pair corresponding to the speech to be recognized; and generating, through the decoder, text information of the speech to be recognized based on the differential pronunciation pair, the acoustic feature, and the language feature;

wherein the pronunciation difference statistics is trained by:

obtaining a target sample text under a target scene;

generating a sample recognition result by recognizing the target sample text;

obtaining a first audio corresponding to the target sample text and obtaining a second audio corresponding to the sample recognition result;

obtaining a differential pronunciation pair sample corresponding to a pronunciation difference between the first audio and the second audio being greater than a preset threshold; and training the pronunciation difference statistics based on the differential pronunciation pair sample.

2. The method of claim 1, wherein obtaining the target sample text under the target scene comprises:

obtaining a sample text;

determining whether the sample text belongs to a target scene by inputting the sample text to a target scene text classifier;

determining the sample text as the target sample text based on the sample text belonging to the target scene; and discarding the sample text based on the sample text not belonging to the target scene.

3. The method of claim 2, wherein, the target scene text classifier is trained by:

obtaining a target scene sample and a non-target scene sample;

obtaining a first word vector representation of the target scene sample and a second word vector representation of the non-target scene sample;

inputting the first word vector representation as a positive sample and the second word vector representation as a negative sample to an initial target scene text classifier to train the initial target scene text classifier.

4. The method of claim 1, wherein generating the text information of the speech to be recognized based on the differential pronunciation pair sample, the acoustic feature, and the language feature comprises:

inputting the differential pronunciation pair, the acoustic feature, and the language feature to a decoder to generate the text information of the speech to be recognized.

5. An electronic device, comprising:

a search engine, an acoustic model, a language model, and a decoder;

at least one processor; and a memory communicatively coupled to the at least one processor; wherein, the memory stores instructions executable by the at least one processor, wherein the instructions are executed by the at least one processor, so that the search engine obtains a speech to be recognized;

the processor obtains an acoustic feature of the speech to be recognized by inputting the speech to be recognized into the acoustic model and obtains a language feature of the speech to be recognized by inputting the speech to be recognized into the language model, wherein the acoustic model is a model trained by Gaussian Mixed Model (GMM)-Hidden Markov Model (HMM) or Deep Neural Network (DNN)-HMM, and the language model is a model trained by an N-Gram (which is a statistic-based language model) or a Neural Network Language Model (NNLM);

the processor inputs the speech to be recognized to a pronunciation difference statistics to generate a differential pronunciation pair corresponding to the speech to be recognized; and the decoder generates text information of the speech to be recognized based on the differential pronunciation pair, the acoustic feature, and the language feature;

wherein the pronunciation difference statistics is trained by:

obtaining a target sample text under a target scene;

generating a sample recognition result by recognizing the target sample text;

obtaining a first audio corresponding to the target sample text and obtaining a second audio corresponding to the sample recognition result;

obtaining a differential pronunciation pair sample corresponding to a pronunciation difference between the first audio and the second audio being greater than a preset threshold; and training the pronunciation difference statistics based on the differential pronunciation pair sample.

6. The electronic device of claim 5, wherein the processor is further configured to:

obtain a sample text;

determine whether the sample text belongs to a target scene by inputting the sample text to a target scene text classifier;

determine the sample text as the target sample text based on the sample text belonging to the target scene; and discard the sample text based on the sample text not belonging to the target scene.

7. The electronic device of claim 6, wherein the target scene text classifier is trained by:

obtaining a target scene sample and a non-target scene sample;

obtaining a first word vector representation of the target scene sample and a second word vector representation of the non-target scene sample;

inputting the first word vector representation as a positive sample and the second word vector representation as a negative sample to an initial target scene text classifier to train the initial target scene text classifier.

8. The electronic device of claim 5, wherein the processor is further configured to:

input the differential pronunciation pair, the acoustic feature, and the language feature to a decoder to generate the text information of the speech to be recognized.

9. A non-transitory computer-readable storage medium storing computer instructions, wherein the computer instructions are configured to cause a computer to execute a method for recognizing a speech, wherein the computer includes a search engine, an acoustic mode, a language model and a decoder, the method comprising:
- obtaining, through the search engine, a speech to be recognized;
- obtaining an acoustic feature of the speech to be recognized by inputting the speech to be recognized into the acoustic model and obtaining a language feature of the speech to be recognized by inputting the speech to be recognized into the language model, wherein the acoustic model is a model trained by Gaussian Mixed Model (GMM)-Hidden Markov Model (HMI) or Deep Neural Network (DNN)-HMM, and the language model is a model trained by an N-Gram (which is a statistic-based language model) or a Neural Network Language Model (NNLM);
- inputting the speech to be recognized to a pronunciation difference statistics to generate a differential pronunciation pair corresponding to the speech to be recognized; and
- generating, through the decoder, text information of the speech to be recognized based on the differential pronunciation pair, the acoustic feature, and the language feature;
- wherein the pronunciation difference statistics is trained by:
- obtaining a target sample text under a target scene;
- generating a sample recognition result by recognizing the target sample text;
- obtaining a first audio corresponding to the target sample text and obtaining a second audio corresponding to the sample recognition result;
- obtaining a differential pronunciation pair sample corresponding to a pronunciation difference between the first audio and the second audio being greater than a preset threshold; and
- training the pronunciation difference statistics based on the differential pronunciation pair sample.

10. The non-transitory computer-readable storage medium of claim 9, wherein obtaining the target sample text under the target scene comprises:
- obtaining a sample text;
- determining whether the sample text belongs to a target scene by inputting the sample text to a target scene text classifier;
- determining the sample text as the target sample text based on the sample text belonging to the target scene; and
- discarding the sample text based on the sample text not belonging to the target scene.

11. The non-transitory computer-readable storage medium of claim 10, wherein the target scene text classifier is trained by:
- obtaining a target scene sample and a non-target scene sample;
- obtaining a first word vector representation of the target scene sample and a second word vector representation of the non-target scene sample;
- inputting the first word vector representation as a positive sample and the second word vector representation as a negative sample to an initial target scene text classifier to train the initial target scene text classifier.

12. The non-transitory computer-readable storage medium of claim 9, wherein generating the text information of the speech to be recognized based on the differential pronunciation pair sample, the acoustic feature, and the language feature comprises:
- inputting the differential pronunciation pair, the acoustic feature, and the language feature to a decoder to generate the text information of the speech to be recognized.

* * * * *